(12) United States Patent
Kim

(10) Patent No.: US 8,615,075 B2
(45) Date of Patent: Dec. 24, 2013

(54) METHOD AND APPARATUS FOR REMOVING NOISE SIGNAL FROM INPUT SIGNAL

(75) Inventor: Sang-yoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 12/977,589

(22) Filed: Dec. 23, 2010

(65) Prior Publication Data

US 2011/0188641 A1  Aug. 4, 2011

(30) Foreign Application Priority Data

Feb. 4, 2010 (KR) ........................ 10-2010-0010477

(51) Int. Cl.
*H04M 9/08* (2006.01)
(52) U.S. Cl.
USPC ................................ 379/392.01; 379/390.03
(58) Field of Classification Search
USPC ............... 379/406.1–406.16, 390.01–390.03, 379/392.01; 381/71.1–71.14
See application file for complete search history.

(56) References Cited

U.S. PATENT DOCUMENTS

| | | | | |
|---|---|---|---|---|
| 4,622,440 | A | * | 11/1986 | Slavin ........................... 381/313 |
| 5,646,990 | A | * | 7/1997 | Li ............................. 379/406.08 |
| 5,732,143 | A | * | 3/1998 | Andrea et al. ............... 381/71.6 |
| 6,744,885 | B1 | * | 6/2004 | Ketchum et al. ......... 379/406.03 |

FOREIGN PATENT DOCUMENTS

KR 10-2007-0010956 A 1/2007

* cited by examiner

*Primary Examiner* — Simon Sing
(74) *Attorney, Agent, or Firm* — Sughrue Mion, PLLC

(57) ABSTRACT

A method for removing a noise signal from an input signal that is received. In the method, the amount of energy of the input signal is detected, a noise signal included in the input signal is estimated, an intermediate output signal is generated by removing the estimated noise signal from the input signal, and a final output signal is generated by amplifying the amount of energy of the intermediate output signal based on a difference between the amount of energy of the intermediate output signal and the amount of energy of the input signal.

20 Claims, 4 Drawing Sheets

METHOD AND APPARATUS FOR REMOVING NOISE SIGNAL FROM INPUT SIGNAL

CROSS-REFERENCE TO RELATED PATENT APPLICATION

This application claims priority from Korean Patent Application No. 10-2010-0010477, filed on Feb. 4, 2010, in the Korean Intellectual Property Office, the disclosure of which is incorporated herein by reference in its entirety.

BACKGROUND

1. Field

The present disclosure generally relates to a method for removing a noise signal from an input signal and an apparatus therefor.

2. Description of the Related Art

When a voice signal is received by a terminal in a noise environment, a noise signal is also received with the voice signal. In order to remove such a noise signal, received by a terminal together with a voice signal, methods for removing a frequency spectrum of the noise signal from a frequency spectrum of the voice signal have been used.

SUMMARY

The present disclosure provides a method for removing a noise signal from an input signal and an apparatus therefor.

According to an exemplary embodiment, there is provided a method for removing a noise signal. The method may include detecting an amount of energy of the input signal, removing the noise signal from the input signal, the input signal with the noise signal removed being an intermediate output signal, and amplifying the amount of energy of the intermediate output signal, based on a difference between an amount of energy of the intermediate output signal and the amount of energy of the input signal, as a final output signal.

The method may further comprise determining whether an audio signal is included in the input signal, wherein the detecting, the removing, and the amplifying are performed in response to determining that the audio signal is included in the input signal.

The determining of whether an audio signal is included in the input signal may be performed using a Voice Activity Detection (VAD) algorithm.

The determining of whether an audio signal is included in the input signal may be performed based on a frequency spectrum of the input signal.

The noise signal may be a first noise signal and the estimation of the noise signal may be performed based on a second noise signal.

The amount of energy of the intermediate output signal may be obtained by calculating a Root Mean Square (RMS) of the energy of the intermediate output signal.

The amplifying may include detecting the amount of energy of the intermediate output signal, calculating a difference between the amount of energy of the intermediate output signal and the amount of energy of the input signal, determining whether the difference is equal to or greater than a predetermined value, and amplifying the intermediate output signal based on the difference in response to determining that the difference is equal to or greater than the predetermined value, as the final output signal.

According to another aspect, there is provided an apparatus for removing a noise signal from an input signal. The apparatus may include an input signal analyzer that detects an amount of energy of the input signal, an intermediate output generator that removes the noise signal from the input signal, the input signal with the noise signal removed being an intermediate output signal, and a final output generator that amplifies the intermediate output signal, based on a difference between an amount of energy of the intermediate output signal and the amount of energy of the input signal, as a final output signal.

The input signal analyzer may further determine whether an audio signal is included in the input signal, and the detecting the amount of energy of the input signal performed by the input signal analyzer, the detecting performed by the input signal analyzer, the removing performed by the intermediate output generator, and the amplifying performed by the final output generator are performed in response to determining that the audio signal is included in the input signal.

The input signal analyzer may determine whether an audio signal is included in the input signal using a Voice Activity Detection (VAD) algorithm.

The input signal analyzer may determine whether an audio signal is included in the input signal based on a frequency spectrum of the input signal.

The noise signal may be a first noise signal and the input signal analyzer may estimate the noise signal included in the input signal based on a second noise signal.

The amount of energy of the intermediate output signal may be obtained by calculating a Root Mean Square (RMS) of the energy of the intermediate output signal.

The final output generator may detect the amount of energy of the intermediate output signal, calculate a difference between the amount of energy of the intermediate output signal and the amount of energy of the input signal, determine whether the difference is equal to or greater than a predetermined value, and amplifies the intermediate output signal based on the difference in response to determining that the difference is equal to or greater than the predetermined value, as the final output signal.

According to another aspect of the present invention, there is provided a computer readable recording medium storing a computer readable program for executing a method for removing a noise signal.

BRIEF DESCRIPTION OF THE DRAWINGS

The above and other features and advantages will become more apparent by describing in detail exemplary embodiments thereof with reference to the attached drawings in which.

DETAILED DESCRIPTION

The present disclosure will now be described more fully with reference to the accompanying drawings, in which exemplary embodiments are shown.

Figure 1:
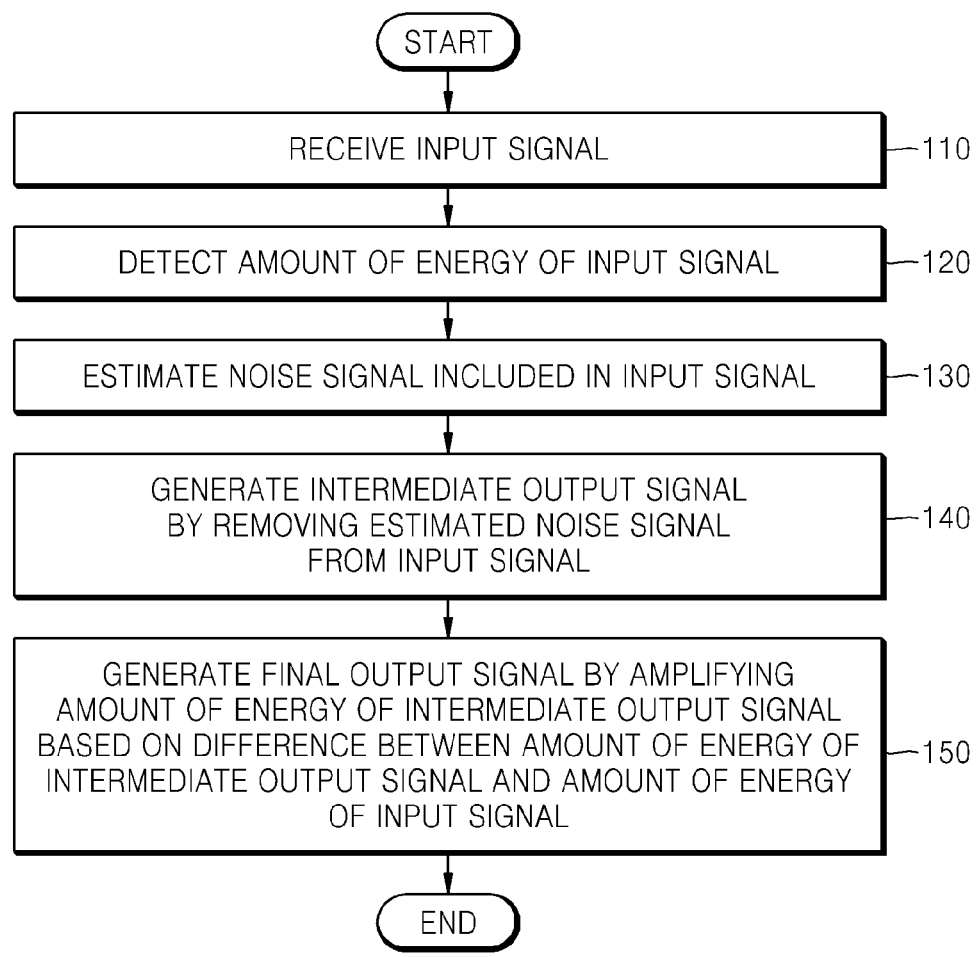
FIG. 1 is a flowchart of a method for removing a noise signal according to an exemplary embodiment.

FIG. 1 is a flowchart of a method for removing a noise signal according to an exemplary embodiment.

Referring to FIG. 1, an input signal is received, in step 110.

Herein, the input signal may include only a noise signal or both a noise signal and an audio signal. The audio signal denotes a voice signal of a user or the like.

For example, when the user speaks via a transmission terminal in a noise environment, surrounding noise is input to the transmission terminal together with the voice of the user. In this case, an input signal, including the voice of the user and the surrounding noise, is input to the transmission terminal.

Further, determining whether an audio signal is included in the input signal may be performed. As a result of the determination, steps 120 to 150 may be performed for the input signal only when an audio signal is included in the input signal. Herein, the determination of whether an audio signal is included in the input signal may be performed based on a frequency spectrum of the input signal. For example, if the input signal is periodic, it may be determined that an audio signal is included in the input signal. However, if the input signal is non-periodic, it may be determined that an audio signal is not included in the input signal.

A Voice Activity Detection (VAD) algorithm may be used as another method for determining whether an audio signal is included in the input signal. Since the VAD algorithm is the well-known concept to those of ordinary skill in the art, the VAD algorithm will not be described.

Meanwhile, if an audio signal is not included in the input signal, the amount of energy of the input signal can be minimized according to a predetermined criterion. For example, by detecting a frequency spectrum of the input signal, which includes no audio signal, and deducting the detected frequency spectrum from the input signal, the amount of energy of the input signal can be minimized.

The amount of energy of the input signal is detected, in step 120.

A noise signal included in the input signal is estimated, in step 130.

Herein, the noise signal included in the input signal may be estimated based on a noise signal that has been received before the input signal is received. For example, voice of the user cannot arrive at the transmission terminal within 10 ms after a call starts via the transmission terminal. Accordingly, input signals received by the transmission terminal within the first 10 ms of call initiation may be determined to include only a noise signal. Therefore, such a pure noise signal may be used for estimating a noise signal included in an input signal that includes both a voice signal and the noise signal.

If a pure noise signal corresponds to static noise, a noise signal included in an input signal, which includes both a voice signal and the noise signal, will be similar to the pure noise signal received discussed above. Accordingly, even if an input signal includes a voice signal and a noise signal, the previously received pure noise signal can be estimated as the noise signal included in the input signal.

However, if a pure noise signal corresponds to non-static noise, there is a high possibility that a noise signal included in an input signal, which includes both a voice signal and the noise signal, is different from the pure noise signal. Accordingly, if an input signal includes a voice signal and a noise signal, the noise signal included in the input signal will have to be newly estimated. This estimation may be accomplished by using the previously received pure noise signal as an initial value.

Herein, the static noise denotes constant noise, regardless of time, such as noise of vehicles traveling at a constant speed or the noise of wind, and the non-static noise denotes noise varying along time due to mixture of voices of people and various sounds in a restaurant or a department store.

Meanwhile, an input signal including both of a voice signal and a noise signal is not always successively received once a pure noise signal is received. Rather, a time interval in which a pure noise signal is received and a time interval in which an input signal, which includes both of a voice signal and a noise signal, may alternately appear.

Herein, the time interval in which a pure noise signal is received can be called a mute interval, and the time interval in which an input signal, which includes both of a voice signal and a noise signal, is received can be called a voice interval. If a pure noise signal is received in an arbitrary mute interval, when a noise signal, which is included in an input signal received in a voice interval following the mute interval, is estimated, the pure noise signal received in the previous mute interval is used to estimate the noise signal in the voice interval. In other words, every occasion at which a mute interval appears, the noise signal in the mute interval may be determined. Subsequently, in a voice interval after the mute interval, a noise signal included in an input signal received in a voice interval may be estimated using a pure noise signal received and determined in the mute interval.

An intermediate output signal is generated by removing the estimated noise signal from the input signal, in step 140.

In more detail, by deducting a frequency spectrum of the estimated noise signal from a frequency spectrum of the input signal, the intermediate output signal is generated.

Herein, the greater the amount of energy of a noise signal removed from the input signal, the smaller the amount of energy of the intermediate output signal.

A final output signal is generated by amplifying the amount of energy of the intermediate output signal based on a difference between the amount of energy of the intermediate output signal and the amount of energy of the input signal, in step 150.

Herein, the amount of energy of the intermediate output signal and the amount of energy of the input signal may be obtained by calculating the Root Mean Square (RMS) of each of the energy of the intermediate output signal and the energy of the input signal.

When the final output signal is generated, the final output signal may be transmitted to a reception terminal. That is, when a transmission terminal generates a final output signal through steps 110 to 150, the transmission terminal transmits the final output signal to a reception terminal.

According to an exemplary embodiment of the present invention, a reception terminal can receive such a final output signal having the same amount of energy as that of an input signal input to a transmission terminal by a user of the transmission terminal without adjusting a volume of the reception terminal.

However, conventionally, since a transmission terminal transmits an intermediate output signal to a reception terminal without amplifying the energy of the intermediate output signal, a user of the reception terminal must adjust a volume of the reception terminal or use another method in order to make the amount of energy of the intermediate output signal the same as the amount of energy of an input signal input to a transmission terminal by a user of the transmission terminal.

Consequently, according to an exemplary embodiment, since a user of a reception terminal can automatically hear a voice corresponding to a final output signal having the same amount of energy as that of an input signal input to a transmission terminal by a user of the transmission terminal, without any one of the user of the transmission terminal and the user of the reception terminal performing an additional operation such as volume adjustment, user convenience increases.

Meanwhile, according to another exemplary embodiment, by amplifying the amount of energy of an intermediate output signal, based on whether a difference between the amount of energy of the intermediate output signal and the amount of energy of an input signal is equal to or greater than a critical value, a final output signal may be generated. This will now be described with reference to FIG. 2.

Figure 2:
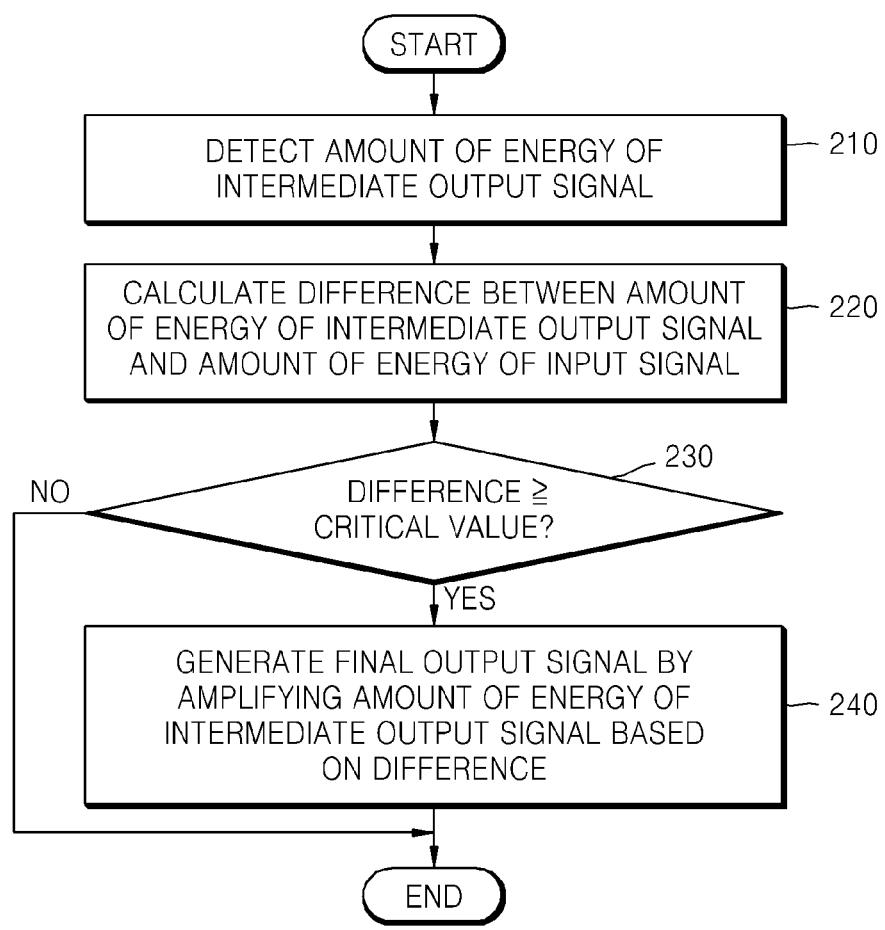
FIG. 2 is a flowchart of a method for generating a final output signal according to an exemplary embodiment.

FIG. 2 is a flowchart of a method for generating a final output signal according to an exemplary embodiment. Herein, it is assumed that steps 110 to 140 of FIG. 1 have already been performed.

Referring to FIG. 2, the amount of energy of the intermediate output signal is detected, in step 210.

Herein, since the amount of energy of the input signal has been detected in step 120 of FIG. 1, only the amount of energy of the intermediate output signal is detected, in step 210.

A difference between the amount of energy of the intermediate output signal and the amount of energy of the input signal is calculated, in step 220.

It is determined, in step 230, whether the difference is equal to or greater than a critical value.

If it is determined that the difference is less than the critical value, the amount of energy of the intermediate output signal is not amplified. However, if it is determined that the difference is equal to or greater than the critical value, the process proceeds to step 240.

If the difference is equal to or greater than the critical value, a final output signal is generated by amplifying the amount of energy of the intermediate output signal based on the difference, in step 240.

For example, when the critical value is 3 dB, if the difference between the amount of energy of the intermediate output signal and the amount of energy of the input signal is 5 dB, which is greater than 3 dB critical value, the final output signal is generated by amplifying the amount of energy of the intermediate output signal by 5 dB.

However, when the critical value is 3 dB, if the difference between the amount of energy of the intermediate output signal and the amount of energy of the input signal is 2 dB, which is less than 3 dB critical value, the amount of energy of the intermediate output signal is not amplified.

Herein, the critical value is not limited to 3 dB and may be set to a value greater or less than 3 dB.

As described above, if intermediate output signals are selectively amplified based on the critical value, when a difference between the amount of energy of an intermediate output signal and the amount of energy of an input signal is too small for a user of a reception terminal to recognize, a transmission terminal may transmit the intermediate output signal to the reception terminal without amplifying the amount of energy of the intermediate output signal. This reduces power consumption for an operation of amplifying the intermediate output signal in the transmission terminal.

Figure 3:
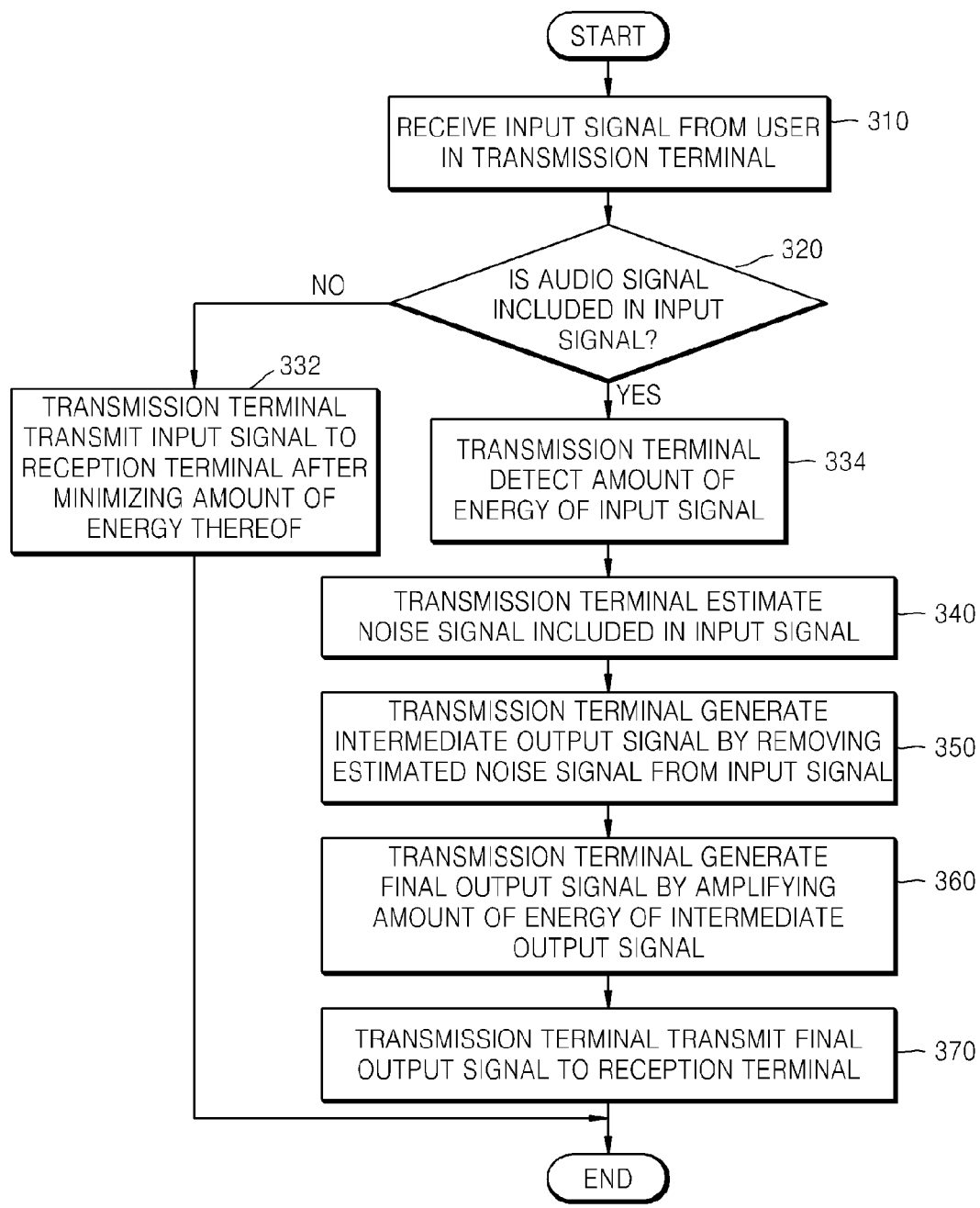
FIG. 3 is a flowchart for describing an application example of a method for removing a noise signal according to an exemplary embodiment.

FIG. 3 is a flowchart of a method for removing a noise signal according to an exemplary embodiment.

Referring to FIG. 3, a transmission terminal receives an input signal from a user, in step 310.

The transmission terminal determines, in step 320, whether an audio signal is included in the input signal.

If it is determined that an audio signal is not included in the input signal, the transmission terminal minimizes the amount of energy of the input signal and transmits the input signal to a reception terminal, in step 332.

For example, the transmission terminal may detect a frequency spectrum of the input signal, deduct the detected frequency spectrum from the input signal, and then transmit the deducted result to the reception terminal.

If it is determined that an audio signal is included in the input signal, the transmission terminal detects the amount of energy of the input signal, in step 334.

The transmission terminal estimates a noise signal included in the input signal, in step 340.

The transmission terminal generates an intermediate output signal by removing the estimated noise signal from the input signal, in step 350.

The transmission terminal generates a final output signal by detecting the amount of energy of the intermediate output signal and amplifying the amount of energy of the intermediate output signal, based on a difference between the amount of energy of the intermediate output signal and the amount of energy of the input signal, in step 360.

The transmission terminal transmits the final output signal to the reception terminal, in step 370.

Figure 4:
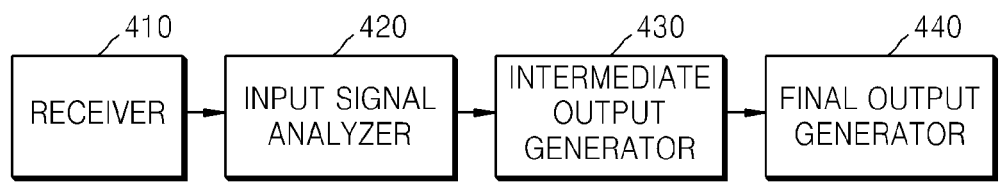
FIG. 4 is a block diagram of an apparatus for removing a noise signal according to an exemplary embodiment.

FIG. 4 is a block diagram of an apparatus for removing a noise signal according to an exemplary embodiment. Referring to FIG. 4, the apparatus includes a receiver 410, an input signal analyzer 420, an intermediate output generator 430, and a final output generator 440. Herein, the apparatus for removing a noise signal according to an exemplary embodiment may be embedded in a transmission terminal.

The receiver 410 receives an input signal.

The input signal analyzer 420 detects the amount of energy of the input signal and estimates a noise signal included in the input signal.

Herein, the input signal analyzer 420 can further determine whether an audio signal is included in the input signal received via the receiver 410.

The intermediate output generator 430 generates an intermediate output signal by removing the estimated noise signal from the input signal.

The final output generator 440 generates a final output signal by amplifying the amount of energy of the intermediate output signal based on a difference between the amount of energy of the intermediate output signal and the amount of energy of the input signal.

When the final output generator 440 generates the final output signal, the transmission terminal can transmit the final output signal to a reception terminal.

The exemplary embodiment of FIG. 4 illustrates an apparatus for removing a noise signal. The functions of the receiver 410, input signal analyzer 420, intermediate output generator 430, and final output generator 440 may be realized by electrical circuitry, such as gates, arrays, field programmable gate arrays (FPGAs), filters, amplifiers, and the like, or by a central processing unit (CPU). The apparatus may further include a memory (RAM, ROM, etc.) that stores energies of signals for comparison, amplification, and transmission, as discussed in the exemplary embodiments above.

The exemplary embodiments may be written as computer programs and can be implemented by processors in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While exemplary embodiments been particularly shown and described, it will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the invention is defined not by the detailed description of the invention, but by the appended claims, and all differences within the scope will be construed as being included in the present invention.

What is claimed is:

1. A method for removing a noise signal from an input signal, the method comprising:
   detecting an amount of energy of the input signal;
   removing the noise signal from the input signal, the input signal with the noise signal removed being an intermediate output signal; and
   amplifying the intermediate output signal, based on a difference between an amount of energy of the intermediate output signal and the amount of energy of the input signal, as a final output signal.

2. The method of claim 1, further comprising determining whether an audio signal is included in the input signal,
   wherein the detecting, the removing, and the amplifying are performed in response to determining that the audio signal is included in the input signal.

3. The method of claim 2, wherein the determining of whether an audio signal is included in the input signal is performed using a Voice Activity Detection (VAD) algorithm.

4. The method of claim 2, wherein the determining of whether an audio signal is included in the input signal is performed based on a frequency spectrum of the input signal.

5. The method of claim 1, further comprising:
   estimating the noise signal included in the input signal, the noise signal being a first noise signal,
   wherein the estimating is performed based on a second noise signal.

6. The method of claim 1, wherein the amount of energy of the intermediate output signal and the amount of energy of the input signal are obtained by calculating a Root Mean Square (RMS) of each of the energy of the intermediate output signal and the energy of the input signal.

7. The method of claim 1, wherein the amplifying comprises:
   detecting the amount of energy of the intermediate output signal;
   calculating a difference between the amount of energy of the intermediate output signal and the amount of energy of the input signal;
   determining whether the difference is equal to or greater than a predetermined value; and
   amplifying the intermediate output signal based on the difference in response to determining that the difference is equal to or greater than the predetermined value, as the final output signal.

8. An apparatus for removing a noise signal from an input signal, the apparatus comprising:
   an input signal analyzer that detects an amount of energy of the input signal;
   an intermediate output that removes the noise signal from the input signal, the input signal with the noise signal removed being an intermediate output signal; and
   a final output generator that amplifies the intermediate output signal, based on a difference between an amount of energy of the intermediate output signal and the amount of energy of the input signal, as a final output signal.

9. The apparatus of claim 8, wherein the input signal analyzer further determines whether an audio signal is included in the input signal, and
   wherein the detecting the amount of energy of the input signal performed by the input signal analyzer, the detecting performed by the input signal analyzer, the removing performed by the intermediate output generator, and the amplifying performed by the final output generator are performed in response to determining that the audio signal is included in the input signal.

10. The apparatus of claim 9, wherein the input signal analyzer determines whether an audio signal is included in the input signal using a Voice Activity Detection (VAD) algorithm.

11. The apparatus of claim 9, wherein the input signal analyzer determines whether an audio signal is included in the input signal based on a frequency spectrum of the input signal.

12. The apparatus of claim 8, wherein the noise signal is a first noise signal, and
   wherein the input signal analyzer estimates the noise signal included in the input signal based on a second noise signal.

13. The apparatus of claim 8, wherein the amount of energy of the intermediate output signal and the amount of energy of the input signal are obtained by calculating a Root Mean Square (RMS) of each of the energy of the intermediate output signal and the energy of the input signal.

14. The apparatus of claim 8, wherein the final output generator detects the amount of energy of the intermediate output signal, calculates a difference between the amount of energy of the intermediate output signal and the amount of energy of the input signal, determines whether the difference is equal to or greater than a predetermined value, and amplifies the intermediate output signal based on the difference in response to determining that the difference is equal to or greater than the predetermined value, as the final output signal.

15. A computer readable recording medium storing a computer readable program for executing the method of claim 1.

16. A method of generating an output voice signal from an input signal that omits a noise signal included in the input signal, the method comprising:
   filtering the noise signal from the input signal;
   amplifying the filtered input signal, based on a difference between an energy of the input signal and an energy of the filtered input signal, as the output voice signal.

17. The method of claim 16, wherein the filtering comprises subtracting a frequency spectrum of the noise signal from a frequency spectrum of the input signal.

18. The method of claim 16, further comprising:
   receiving the input signal; and
   outputting the amplified filtered input signal as the output voice signal.

19. The method of claim 18, further comprising:
   estimating the noise signal included in the input signal, and
   wherein the filtering comprises filtering the estimated noise signal from the input signal.

20. The method of claim 19, wherein the noise signal is a first noise signal, and
   wherein the estimating comprises:
   detecting a second noise signal in a second input signal received prior to the receiving the input signal; and
   estimating the noise signal to be the second noise signal.

* * * * *